United States Patent [19]

Bendik

[11] 4,014,131
[45] Mar. 29, 1977

[54] FISH HOOK EXTRACTOR

[76] Inventor: John Bendik, 2821 Schurz Ave., Bronx, N.Y. 10456

[22] Filed: Mar. 23, 1976

[21] Appl. No.: 669,693

[52] U.S. Cl. .................................. 43/53.5; 294/1 R
[51] Int. Cl.² ........................................ A01K 97/00
[58] Field of Search ............. 294/1 R, 2, 12, 9, 24, 294/126; 43/53.5; 7/1 H; D22/31

[56] References Cited

UNITED STATES PATENTS

| | | | |
|---|---|---|---|
| 2,244,270 | 6/1941 | Verrett | 43/53.5 |
| 2,512,818 | 6/1950 | Wikarski | 43/53.5 |
| 2,695,471 | 11/1954 | Imberti | 43/53.5 |
| 2,861,383 | 11/1958 | Gray | 43/53.5 |
| 3,034,252 | 5/1962 | Basinski | 43/53.5 |
| 3,713,243 | 1/1973 | Tetzner | 43/53.5 |

*Primary Examiner*—James B. Marbert
*Attorney, Agent, or Firm*—Spellman & Joel

[57] ABSTRACT

A fish hook extractor comprises an elongated member having gripping means at one end and a slotted end portion at the other end thereof. The slotted end portion comprises a pair of legs located at an angle to the plane of the elongated member, each of said legs having a tapered outer face leading to the entrance of the slot. The slot is of decreasing width leading to an arcuate base portion. A transversely slidable member is mounted in an aperture extending through the elongated member at a point near the gripping means so that the fishing line may be wrapped thereabout after the extractor is inserted into the fish's mouth and has caught the hook in the slot. The extractor is first pushed inwardly to dislodge the hook and then pulled outwardly drawing the hook out of the fish. A second embodiment includes a member having the rear portion which is slidable along the elongated member and a projecting front portion having a predetermined slot extending inwardly from one side and at an angle. The lead portion of the slidable member is tapered to facilitate coupling to a hook lodged in a fish's lip or immediately within the mouth. This second embodiment operates similar to the first embodiment, but it also includes means suited to withdrawing hooks from a fish's lip.

4 Claims, 4 Drawing Figures

FISH HOOK EXTRACTOR

BACKGROUND OF THE INVENTION

The present invention relates to fishing and more particularly to a means for extracting fish hooks from fish.

In the past, it has been extremely difficult to withdraw fish hooks from a larger fish such as cod and often in an attempt to pull the hook out of the fish, the line broke leaving the hook embedded in the fish. This would not only cause a problem in processing the fish with the fish hook embedded therein, but it is also costly and time consuming for the fisherman who must then put a new hook on his line, losing both the hook and the time necessary to affix the new hook to his line. Prior art solutions have either been ineffective or too costly and as a consequence, fishermen are still confronted with the problem of withdrawing hooks from fish without losing the hooks in the process. The ease of handling the fish hook extractor of the present invention plus its low cost are distinct advantages.

SUMMARY OF THE INVENTION

This invention comprises an extractor for withdrawing hooks from fish in a simple and expeditious manner. In a first embodiment, the invention comprises an elongated body member such as a metal bar having a slotted portion at one end and gripping means at the other end. Intermediate the ends is located in a transversely slidable member about which the line is wrapped for gripping purposes. The slotted end has a pair of tapered legs and a slot of decreasing width and is located at an angle to the plane of the main body portion.

In operation, the elongated body member could be gripped at one end and inserted into the fish's mouth so that the hook is caught in the slot. The extractor would then be lodged in place and the line wrapped about the transversely slidable member. Next, the extractor would be pushed forward in the fish's mouth, dislodging the hook which would then be withdrawn on the next storke. In the second embodiment, a member is provided which has a rear portion slidable along the elongated member and a flat substantially rectangular section at the other end having a slot extending from one side inwardly towards an outer tapered edge. This embodiment is particularly suited for instances where the hook is lodged in the fish's lip, and in such cases the base of the hook would be positioned in the bottom of the slot, the line grasped and pulled, if necessary, in a direction opposite to the extractor member thereby withdrawing the hook from the fish's lip. In some instances, the weight of the fish may be sufficient to free the hook without pulling.

Accordingly, it is an object of this invention to provide a new and improved extractor for fish hooks.

Another object of this invention is to provide a new and improved fish hook extractor which is rather simple and easy to use and which may be used whether the hook is embedded deeply in the fish's innards or in the fish's lip.

A further object of this invention is to provide a fish hook extractor for larger fish wherein the hook is caught in one end of the extractor to dislodge said hook and which is then withdrawn, pulling the hook out of the fish and thereby saving the time of placing another hook on the line.

BRIEF DESCRIPTION OF THE DRAWINGS

Other objects and advantages of the present invention will be more clearly seen when viewed in conjunction with the accompanying drawings wherein.

DETAILED DESCRIPTION OF THE DRAWINGS

Figure 1:
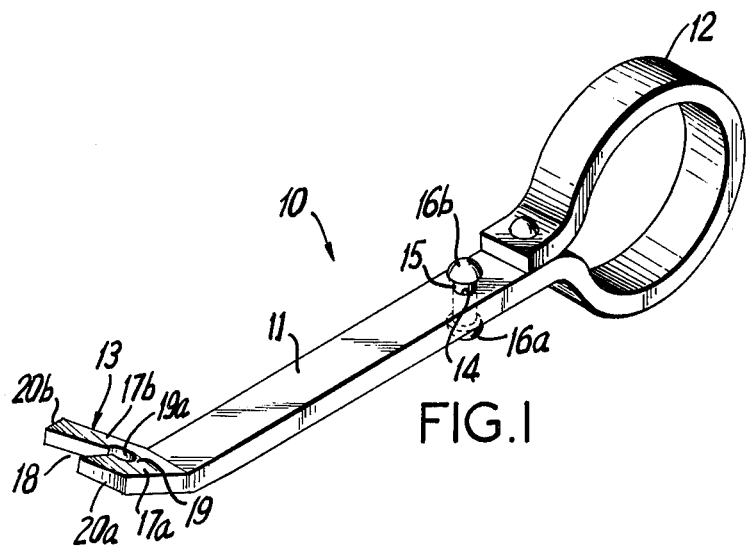
FIG. 1 is a perspective view of the first embodiment of the invention.
Figure 2:
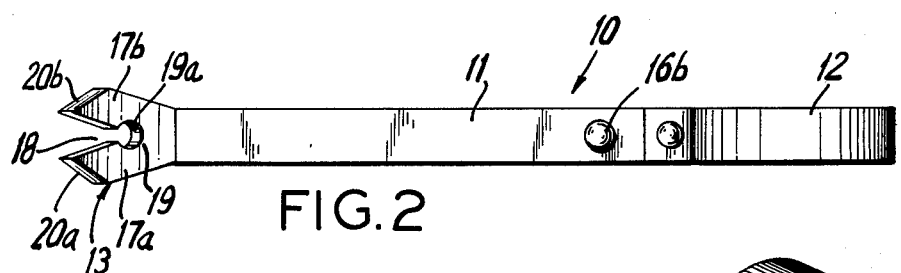
FIG. 2 is a side view of the fish hook extractor of FIG. 1.
Figure 3:
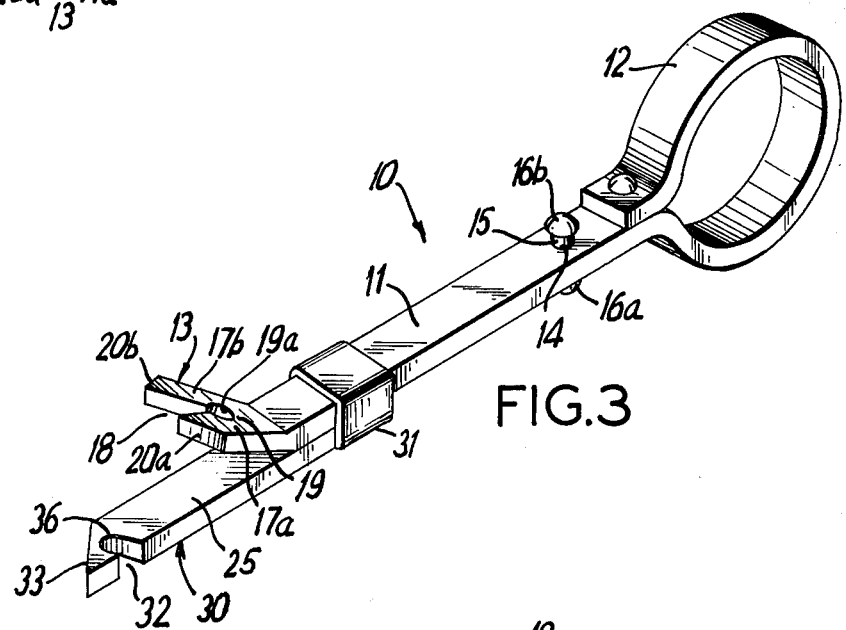
FIG. 3 is a perspective view of the second embodiment of the invention.
Figure 4:
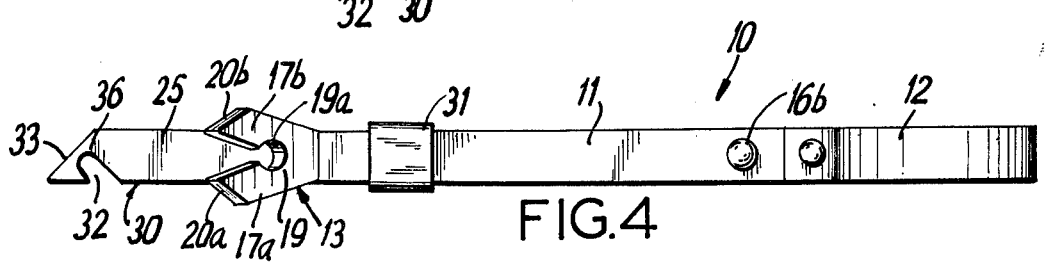
FIG. 4 is a side view of the second embodiment of the invention.

Referring now to the drawings, the invention compirses a fish hook extractor 10 having an elongated main body portion 11, a gripping means 12 at one end and a slotted end portion 13 at the other end. The gripping means 12 may comprise a handle or an extension of the main body portion which is bent back upon itself and affixed thereto to form a convenient handle.

The body portion 11 is preferably an elongated bar of a light weight metal such as aluminum which includes an aperture 13 extending therethrough at a predetermined distance from the gripping means and a transversely slidable member 15 having enlarged heads 16a and 16b locking the member 15 in the aperture.

The slotted end portion 13 extends upwardly at an angle to the axis of the body portion 11 and includes a pair of legs 17a and 17b towards the end thereof. The legs 17a and 17b form a slot 18 of decreasing width leading to an arcuate base 19a. The leading edges 20a and 20b of the legs 17a and 17b are tapered to facilitate entry into the fish. The design of the slotted end portion is quite simple and may be readily affected by drilling a hole 19 through the bar 11 and then cutting a slot from the end of the portion 13 to the slot. Finally, the legs 17a and 17b are spread apart forming the slot 18 of decreasing width.

In the second embodiment, an additional member 30 is provided with an end portion 31 which extends about the body portion 11 and is slidable therealong. The member is locked on the elongated body 11 by the angular end portion 13 at one end and by the handle 12 at the other end. The member 30 includes a flat main portion 25 having a slot extending inwardly and at an angle from one side thereof close to the end portion thereof and a tapered edge 33. This additional member 30 is provided for extracting hooks which are embedded in the fish's mouth or lip.

In operation, the extractor 10 is inserted substantially parallel to the fish line (not shown) into the fish's mouth with the tapered faces 20a and 20b facilitating entry. The hook is caught in the slot 18 and guided therealong by the decreasing width of the slot 18. Preferably, the eye of the hook is then locked in the arcuate base portion 19. The line (not shown) is then wrapped around the transversely slidable member 15 and the extractor is pushed forward dislodging the hook from the fish's innards. The hook is withdrawn by grasping the extractor by the griping means 12 and pulling backwardly at an angle substantially parallel to the plane of the fish. Thus, it is possible to simple and expeditiously withdraw the fishing hook from the fish without losing the hook and being forced to couple another hook to the fishing line or to have the concern of extracting the hook from the fish at a later time. As mentioned previously, the extractor 10 is particularly suited for larger fish such as cod where problems of this nature commonly arise.

The second embodiment of the invention includes a member 30 mounted on the extractor 10 which includes a slot 32 having an arcuate base 36 which is placed about the hook. In this case, the extractor 10 is pulled backwardly withdrawing the hook from the fish's mouth or any relatively accessible portion, or preferably the line is grasped an pulled downwardly opposite the extractor 10. When not in use, the member 30 is merely slidably moved towards the handle 12 so as not to interfere with the operation of the extractor 10.

While the invention has been explained by a detailed description of certain specific embodiments, it is understood that varous modifications and substitutions can be made in any of them within the scope of the appended claims which are intended also to include equivalents of such embodiments.

What is claimed is:

1. A fish hook extractor comprising:
    an elongated member having a gripping means at one end and means for grasping the fishing hook at the other end thereof, siad latter means being positioned at an angle to the plane of the elongated member and including at the other end thereof a slotted portion comprising a pair of legs each having tapered outer faces to facilitate entry of the extractor into a fish and tapered inner faces forming a slot of decreasing width therebetween to guide the fish hook into position within the slot, said outer and inner faces meeting at an acute angle at the end of said legs, and wherein said slot terminates in an enlarged arcuate base portion which catches the hook secruely; and
    a transverse member mounted adjacent the gripping portion for securing the fishing line thereabout to facilitate withdrawing of the hook.

2. A fish hook extractor in accordance with claim 1 wherein:
    the auxiliary member includes an elongated main body portion having a tapered outer edge and a slot extending inwardly towards the end thereof from one side of the body portion and a curved rear face to guide a fish hook therein and an arcuate base portion for gripping the hook and wherein the rear portion of the auxiliary member comprises a portion slidably wrapped about the elongated member and locked in place by the transverse member at one end and the angular slotted portion at the other end.

3. A fish hook extractor in accordance with claim 1 wherein:
    the elongated member comprises a metal bar and the gripping means comprises a handle formed by bending the metal bar back upon itself in a predetermined configuration and securing it to the elongated member.

4. A fish hook extractor in accordance with claim 1 wherein:
    the elongated member includes an aperture extending therethrough at a spaced distance from the gripping means and the transverse member comprises a pin member having a head at each end and which is slibable in the aperture but locked therein by the heads.

* * * * *